June 14, 1960 W. B. HUGHES ET AL 2,940,301
TESTING DEVICE FOR VEHICLE RADIATOR CAPS AND COOLING SYSTEMS
Filed Sept. 10, 1953
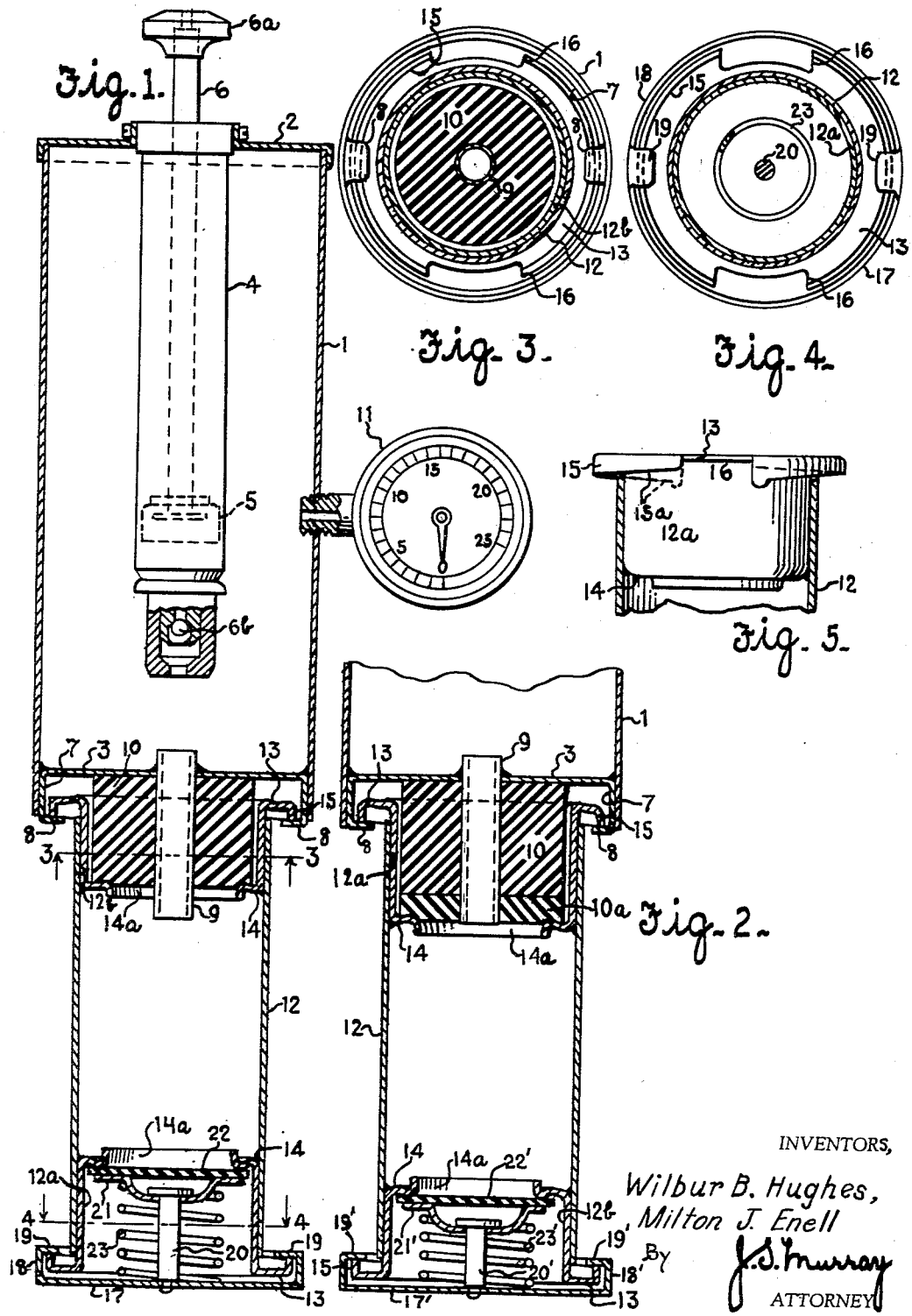
INVENTORS,
Wilbur B. Hughes,
Milton J. Enell
BY J. S. Murray
ATTORNEY

United States Patent Office 2,940,301
Patented June 14, 1960

2,940,301

TESTING DEVICE FOR VEHICLE RADIATOR CAPS AND COOLING SYSTEMS

Wilbur B. Hughes, Detroit, Mich., and Milton J. Enell, Cleveland, Ohio, assignors to Pres-Sure-Tite Products Inc., a corporation of Michigan Filed Sept. 10, 1953, Ser. No. 379,366

12 Claims. (Cl. 73—40)

This invention relates to vehicle radiators and their filler caps and particularly to devices for testing valve members carried by the caps and also testing radiators and connected cooling systems for leakage.

It is a general practice to equip vehicle radiators with upwardly extending filler necks affording seats for the caps and additional seats for spring-pressed valve members installed on the caps. In many instances radiator troubles result from improper functioning of the described valve members. Thus leakage may result from dirt or other particles adhering to either a valve member or its seat, and the springs may be improperly stressed, with consequent unseating of the valve members under too light or too heavy a fluid pressure in the radiator. Also the sealing elements of the valve members may be excessively worn, inducing leakage.

An object of the invention is to provide a simple device for determining the fluid pressure required to unseat a valve member installed on a radiator cap.

Another object is to adapt said device to be applied to either of two types of standard radiator caps.

Another object is to adapt said device for use in locating leaks in a vehicle radiator or the associated cooling system. Another object is to provide a chamber for receiving compressed air and having an outlet for delivering such air to a hollow adapter, equipped with two fittings suited to mount two different types of radiator caps and to seat the valve members of such caps, such fittings being alternatively attachable to said chamber in communication with its outlet.

These and various other objects are attained by the construction hereinafter described and illustrated in the accompanying drawing, wherein:

Fig. 1 is an axial sectional view of my testing device, showing the adapter applied in one of its alternative positions.

Fig. 2 is a fragmentary axial section showing the other alternative position of the adapter.

Figs. 3 and 4 are cross sections taken respectively on the lines 3—3 and 4—4 of Fig. 1.

Fig. 5 is a side elevational view of one of the fittings fixed in the adapter ends.

In these views, the reference character 1 designates a compressed air chamber having front and rear heads 2 and 3 at its respective ends. Such heads may be soldered or otherwise permanently applied and sealed to said ends. Disposed within and coaxially with said chamber is a manually operable air pump 4 terminally carried by the head 2. Such pump comprises the usual piston 5 and plunger 6, the latter projecting exteriorly of the chamber and carrying a suitable actuating knob 6a. A ball check valve 6b assures a unidirectional flow of the pumped air. The head 3 is set back from the corresponding chamber end and has an annular marginal flange 7 snugly fitted in such end. Flush with such end, a pair of tongues 8 project oppositely toward each other. An air outlet tube 9 is soldered or otherwise fixed at one end rigidly and centrally in the head 3, projecting along the extended axis of such head exteriorly of the air chamber. A sealing element 10 of rubber or the like is snugly and centrally mounted on the tube 9 and may be supplemented, under conditions hereinafter described by a sealing element 10a of lesser thickness. The tongues 8 are spaced from the element 10 at opposite sides of such element. An ordinary pressure gauge 11 is carried by and communicates with the chamber, indicating air pressure therein.

Detachably engageable with the head 3 is a cylindrical adapter 12 of lesser diameter than the chamber 1 and having fittings 12a and 12b of different depth soldered or otherwise secured in its ends. Each such fitting has at one of its ends an outwardly projecting annular flange 13 exterior to the body 12, and at its other end an inwardly projecting annular flange 14 forming an opening 14a. Each flange 13 has at its outer margin a cylindrical rim 15, these rims on the two fittings projecting toward each other. Interrupting the flange 13 and rim 15 of each fitting are a pair of diametrically opposed notches 16 proportioned to readily accommodate the tongues 8. Thus either fitting 12a or 12b of the adapter may be interlocked with the head 3 by registering the notches 16 of such fitting with the tongues 8 of said head, then disposing the flange 13 of such fitting within said head and finally rotating the adapter to overlap said flange by said tongues. It will be noted that the rim 15 of each fitting presents two substantially spiral cam-ways 15a (best seen in Fig. 5) to the tongues 8, such cam-ways similarly extending substantially from each notch 16 to the opposite notch. This permits rotative actuation of the adapter 12 in a predetermined direction to effect a tight coupling thereof to the chamber 1 and also to apply an adequate sealing compression to the element 10 as per Fig. 1, or elements 10 and 10a as per Fig. 2 so that the sealing element 10 or 10, 10a and the chamber 1 associated therewith collectively form a closure means for the end of the adapter to which they are coupled.

The described device is suited to test two types of standard cap and valve member assemblies, differing only as to their depth or axial extent. In the drawing, the same reference characters are applied to both assemblies, as they appear respectively in Figs. 1 and 2, but are primed as applied to one thereof. Thus each cap 17 or 17' has a marginal annular rim or skirt 18 or 18' from which a pair of diametrically opposed tongues 19 or 19' project toward each other. Riveted to each cap at its axis is one end of a pin 20 or a materially shorter pin 20', the other end of such pin mounting a valve member 21 or 21', having a limited axial play on such pin. Each valve member carries a sealing disk 22 or 22' of rubber or the like and is urged from the cap by a coiled spring 23 or 23'. The fitting 12a is so proportioned that such rotation of the cap 17 as serves to snugly engage the tongues 19 with the rim 15 of such fitting, also firmly seats the valve member 21 on the flange 14 of such fitting. Similarly the fitting 12b is proportioned to effect a firm seating of the valve member 21' on the flange 14 of such fitting responsive to suitable rotation of the cap 17'. By a reversal of the adapter either of its fittings may occupy the lower position appearing in Figs. 1 and 2, whereby the device is suited to the two illustrated types of caps. When the relatively deep fitting 12a is attached to the chamber 1, as per Fig. 2, both sealing elements 10 and 10a are employed, whereas the element 10 alone suffices when the more shallow fitting 12b engages the chamber.

In use of the described device, an assembly to be tested is coupled to one end of the adapter, which has its other end coupled to the cylinder 1. Air is pumped into the chamber and flows through the tube 9, accumulating at the same pressure in the chamber and adapter. When such pressure reaches a substantially definite predetermined value, usually about seven pounds, the valve member 21 or 21' should unseat. If the valve member unseats prematurely or requires excessive pressure for unseating, the assembly needs replacement or repairs. If the gauge indicates a progressive loss of pressure, leakage past the valve member is indicated. The most common trouble encountered in vehicle cooling systems is a too frequent necessity for refilling. This may be due to a defective cap-mounted valve member or to a leak in the radiator body or connected system. By use of the described device a mechanic may quickly determine if the valve member is at fault. If no fault is found in the valve member, the entire cooling system may be quickly checked by applying the device (without the adapter) to the radiator neck (not shown) and pumping sufficient air into the radiator above the water level to render any leakage point quite evident. An important characteristic of the device is its simplicity and consequent low cost of production.

What I claim is:

1. A motor cooling system testing device comprising a chamber, a pump fitted to said chamber with the outlet thereof arranged to discharge within said chamber, a pressure gauge mounted on said chamber in communication with the interior thereof, coupling means fixed on said chamber and incorporating a pair of tongues thereon projecting oppositely toward each other for application to the radiator neck of said motor cooling system, a compressible sealing unit for said motor cooling system radiator neck spaced inwardly from said coupling means, and means forming an outlet from said chamber through said coupling means and compressible sealing unit.

2. A motor cooling system testing device as defined in claim 1 and further characterized in that said compressible sealing unit is arranged centrally of said coupling means and projects axially therefrom exteriorly of said chamber.

3. A motor cooling system testing device as defined in claim 1 and further characterized in that said last mentioned means comprises a tube projecting rigidly from said chamber and providing a mounting for said sealing unit.

4. A testing device for motor cooling systems of the type having a radiator formed with a filler neck incorporating seats for a radiator cap and for a spring-pressed valve member carried by said cap, said testing device comprising a chamber of tubular form having closure heads at each end thereof, a pump fitted to said chamber at one of said closure heads with the pump outlet arranged to discharge within said chamber, a pressure gauge mounted on said chamber in communication with the interior thereof, a coupling means formed at the other of said chamber closure heads, said coupling means incorporating, a pair of tongues projecting oppositely toward each other for engaging the radiator cap seat of said filler neck, a compressible sealing unit carried at said other closure head and spaced inwardly from said coupling means for seating at said valve member filler neck seat, and means forming an outlet from said chamber through said other closure head and sealing unit.

5. A testing device for motor cooling system radiator caps of the type incorporating a spring-pressed valve member for sealing said cooling system, said testing device comprising a pressure chamber, a pump connected to said chamber for pressurizing said chamber, a pressure gauge mounted on said chamber in communication with the interior thereof, coupling means fixed on said chamber and incorporating a pair of tongues thereon projecting oppositely toward each other with a compressible sealing unit spaced inwardly from said coupling means, means forming an outlet from said chamber through said coupling means and sealing unit, and a cylindrical adapter having outwardly projecting annular flanges at each end thereof and inwardly projecting annular flanges spaced from each end interiorly thereof, said outwardly projecting annular flanges each having diametrically opposed notches formed therein for interlocking respectively with said coupling means and with the radiator cap being tested, and said inwardly projecting annular flanges being spaced respectively for forming a seat for said spring-pressed valve member at the end of said adapter at which said radiator cap is interlocked and for said sealing unit at the other end thereof.

6. A motor cooling system testing device comprising a chamber, a pump fitted to said chamber with the outlet thereof arranged to discharge within said chamber, a pressure gauge mounted on said chamber in communication with the interior thereof, coupling means fixed on said chamber and incorporating a pair of tongues projecting oppositely toward each other for application to the radiator neck of said motor cooling system, a compressible sealing unit for said motor cooling system radiator neck spaced inwardly from said coupling means, and means forming an outlet from said chamber through said coupling means and compressible sealing unit.

7. A testing device for motor cooling system radiator caps of the type incorporating a spring-pressed valve member for sealing said cooling system, said testing device comprising a pressure chamber, a pump connected to said chamber for pressurizing said chamber, a pressure gauge mounted on said chamber in communication with the interior thereof, a coupling means fixed on said chamber and incorporating a pair of tongues projecting oppositely toward each other with a compressible sealing unit spaced inwardly from said coupling means, means forming an outlet from said chamber through said coupling means and sealing unit, and a cylindrical adapter having outwardly projecting annular flanges at each end thereof and inwardly projecting annular flanges spaced from each end interiorly thereof, said outwardly projecting annular flanges each having diametrically opposed notches formed therein for interlocking respectively with said coupling means and with the radiator cap being tested, and said inwardly projecting annular flanges being spaced respectively for forming a seat for said spring-pressed valve member at the end of said adapter at which said radiator cap is interlocked and for said sealing unit at the other end thereof.

8. A testing device for a conventional pressurized engine cooling system of the type having a radiator neck equipped with fastening means and an internal annular valve seat below the top of said neck, said device comprising a chamber, a pump connected to said chamber to discharge air under pressure into said chamber, a pressure gage mounted on said chamber to register air pressure therein, coupling means on said chamber adapted to receive and interlockingly engage the fastening means of said radiator neck, a sealing unit disposed at the center of said coupling means adapted for pressed engagement with said internal valve seat when said chamber is mounted on said radiator neck with said coupling means interlockingly engaged with said fastening means whereby to seal the connection between said chamber and said engine cooling system, and means forming an outlet from said chamber through said coupling means and said sealing unit through which air under pressure in said chamber is admitted into said engine cooling system.

9. A testing device for a pressurized engine cooling system radiator cap of the type having a spring-pressed valve member for sealing said cooling system, said testing device comprising a pressure chamber, a pump connected to said chamber for pressurizing the same, a pressure gage on said chamber in communication with the interior thereof, a coupling on said chamber including an external sealing unit at the center of said coupling, means forming an outlet from said chamber through said coupling and said sealing unit, a cylindrical member adapted to receive said sealing unit in one end thereof, fastening means on the mentioned end of said cylindrical member for detachably connecting with said coupling, an internal valve seat in said cylindrical member adjacent to the mentioned end thereof for sealingly engaging said sealing unit when said pressure chamber is detachably connected to said cylindrical member, fastening means on the other end of said cylindrical member for receiving and detachably interconnecting with a radiator cap to be tested, and an internal annular valve seat in said cylindrical member adjacent to said other end for seating the spring pressed valve member of said radiator cap when the latter is on and detachably connected to said cylindrical member.

10. A testing device for an engine cooling system radiator cap of the type having a spring-pressed valve member for sealing said cooling system, said testing device comprising a cylindrical casing having oppositely outwardly facing internal annular valve seats adjacent to the ends thereof and spaced different distances from said ends, coupling means at each end of said casing, a closure for one end of said casing having fastening means for detachably interconnecting with the coupling means at said one end, a sealing unit adapted to fit within said casing and to be confined between said closure and the adjacent annular seat for pressurized engagement with said annular seat when said closure is on and detachably connected to said one end of the casing, the coupling means at the other end of said casing adapted to receive and detachably interconnect with a radiator cap to be tested with the spring-pressed valve member of said cap in engagement with the annular seat adjacent to said other end, means for pressurizing said casing, and a pressure gage in communication with the interior of said casing for registering the pressure therein.

11. A testing device as defined in claim 10 wherein the coupling means at the ends of the casing are identical so that said closure is engageable with either end of the casing and wherein said sealing unit is adjustable to fit between said closure and either of said valve seats.

12. A testing device for an engine cooling system radiator cap of the type having a spring-pressed valve member for sealing said cooling system, said testing device comprising a cylindrical casing having oppositely outwardly facing internal annular valve seats adjacent to the ends thereof, coupling means at each end of said casing, a closure for one end of said casing having fastening means for detachably interconnecting with the coupling means at said one end, a sealing unit adapted to fit within said casing and to be confined between said closure and the adjacent annular seat for pressurized engagement with said annular seat when said closure is on and detachably connected to said one end of the casing, the coupling means at the other end of said casing adapted to receive and detachably interconnect with a radiator cap to be tested with the spring-pressed valve member of said cap in engagement with the annular seat adjacent to said other end, means for pressurizing said casing, and a pressure gage in communication with the interior of said casing for registering the pressure therein.

References Cited in the file of this patent

UNITED STATES PATENTS

| | | |
|---|---|---|
| 1,335,073 | Osborn | Mar. 30, 1920 |
| 1,337,132 | Harpst | Apr. 13, 1920 |
| 1,764,616 | Fleming | June 17, 1930 |
| 1,848,198 | Reid | Mar. 8, 1932 |
| 2,178,901 | Webster | Nov. 7, 1939 |
| 2,225,964 | Bailey | Dec. 24, 1940 |
| 2,446,219 | Eaton | Aug. 31, 1948 |
| 2,618,152 | Kissinger | Nov. 18, 1952 |
| 2,668,437 | Patch | Feb. 9, 1954 |

OTHER REFERENCES

Tels Leak Detector, publication by James Industries, Skaneateles, N.Y., Copy received January 1948, 3 pages.